Sept. 26, 1939. W. J. MISKELLA Re. 21,220

BASKET LINER OR THE LIKE

Original Filed Feb. 14, 1934

Inventor:
William J. Miskella,
By Dyrenforth, Lee, Christton & Miles,
Att'ys.

Reissued Sept. 26, 1939

Re. 21,220

UNITED STATES PATENT OFFICE 21,220

BASKET LINER OR THE LIKE

William J. Miskella, Chicago, Ill., assignor, by mesne assignments, to Mid-States Gummed Paper Company, a corporation of Delaware Original No. 2,033,728, dated March 10, 1936, Serial No. 711,236, February 14, 1934. Application for reissue December 22, 1936, Serial No. 117,246

7 Claims. (Cl. 217—3)

This invention relates to a basket liner or the like. The liner is particularly useful in the packing of apples, other fruits, and vegetables, etc.

It has been the practice for many years to use a paper liner which fits within a temporary metal shell to serve as a temporary support or mold for packing fruits, vegetables, etc. When the liner is filled, the basket or permanent container is slipped over the outside of the liner and the liner is turned up so that the fruit which was on the bottom of the liner now appears at the top of the basket, the temporary metal shell having been removed. The basket is then dropped or jolted to force the fruit contents against the liner wall so as to break it. This leaves the fruit in the desired position within the basket. In the above practice, it has been found that the dropping or jolting of the basket or container tends to bruise some of the fruit and causes spoiling or decaying.

The primary purpose of my invention is to provide a liner equipped with elastic bonding means which provides an expanding joint. Such a joint not only permits the liner to accommodate itself to the container, but also serves to yield gradually under the weight of the fruit to separate the ends of the liner. The expanding joint permits the apples or other fruit to settle gently within the basket without bruising. Other specific objects and advantages will appear as the specification proceeds.

The invention is illustrated, in a preferred embodiment, by the accompanying drawing, in which—

Figure 1:
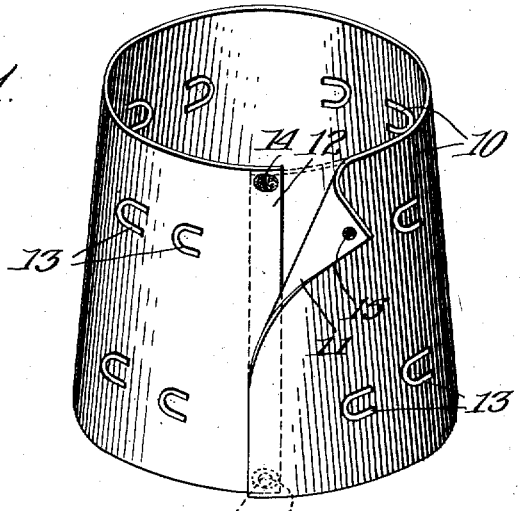
Figure 2:
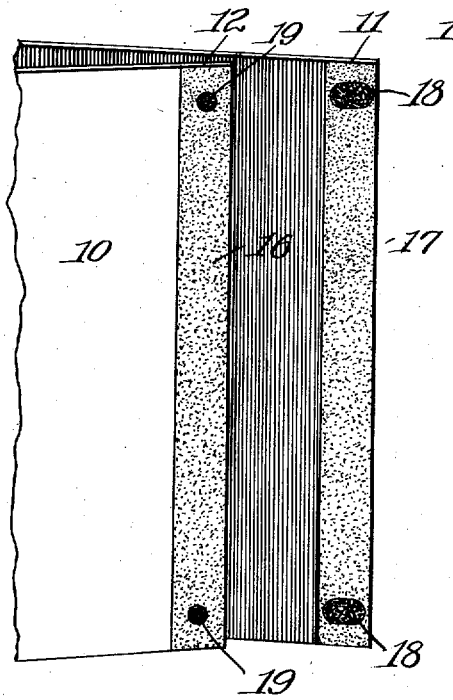

Figure 1 is a perspective view of a liner embodying my invention; Fig. 2, a broken enlarged side view of the ends of a modified form of liner; and Fig. 3, a view similar to Fig. 2 of another modified form of liner.

In the illustration given in Fig. 1, 10 designates a liner body which may be formed of fabric or any suitable paper such as, for example, heavy cardboard, chipboard, laminated paper, treated papers, etc. The body 10 is provided with overlapping ends 11 and 12. The shape of the body 10 may be as illustrated in Fig. 1, or as required for any particular basket or container. Normally, the liner will be creased at a point substantially diametrically opposed to the free end 12 and shipped in such folded condition, the edge 11 extending beyond the free edge 12 to form an attachment flap. If desired, the body 10 may be provided with apertures 13 of any suitable size or shape.

In order to provide an expanding joint, I form on the inner surface of flap 11, and on the outer border edge of end 12, bonding materials of latex, rubber or other suitable elastic materials. In the illustration given, I have provided at each end of the border strip 12, a spot 14 of such a bonding material, and on the inner side of flap 11, a spot 15 of bonding material. It will be noted that the spot 14 is much larger than spot 15 so that the circumference of the liner can be adjusted depending upon the point at which spot 15 is pressed against spot 14. As a bonding material, I prefer to employ an elastic material which has little or no attraction for paper or fabric, but which has great cohesive strength. For this purpose, I find that treated latex, latex composition, latex compounds, etc., are satisfactory. When the latex is applied to the liner borders to form the spots 14 and 15, the liquid attaches itself firmly to the paper. However, after drying, the latex will not stick to the fabric or paper, but when the spots 14 and 15 are brought together, they form a tenaciously cohesive bond. The liners may therefore be shipped in stacks and in folded condition without any tendency of the spots to stick to adjoining sheets. Before the liners are placed in position, the free ends may be adjusted quickly to the proper size, and then securely locked together by pressing the spots 14 and 15 against each other. The liner may then be filled and turned within the basket. The pressure of the fruit will tend to expand the latex bond and separate the free ends of the liner, the yielding character of the bond permitting the fruit to gently settle into position.

The areas of latex may be varied in size to give the desired strength and capacity to yield under predetermined pressures. To aid in folding the liners, the walls may be scored at the desired points.

In the modified form illustrated in Fig. 2, I have provided lacquer, glue, or other protective coatings 16 and 17 to protect the paper against injury. The bands 16 and 17 of suitable protective material are first applied to the paper and then the spots 18 and 19 applied. When the liner is later expanded to break the elastic bond, the layers 16 and 17 protect the paper from being torn so that the break in every instance occurs in the latex bond itself.

Figure 3:
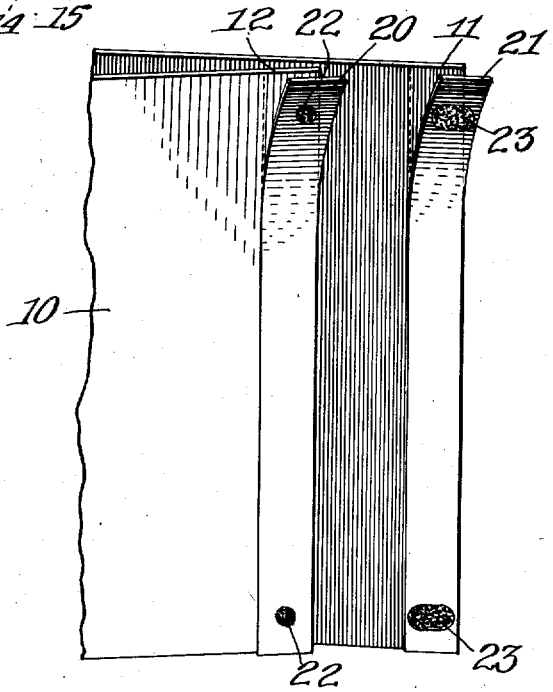

In Fig. 3, another form of protective means is employed. Paper strips 20 and 21 are glued to the ends 12 and 11 and the latex spots 22 and 23 applied to the strips 20 and 21. It will be understood that many other means for protecting the paper from tearing may be substituted for the illustrative means shown. For example, the paper may be embossed or treated in other ways to protect the immediate areas upon which the latex spots are formed. When cloth fabric is used, instead of paper, it may be desirable to omit the protective substrata layers.

In applying latex to the free ends of the liner body 10, the bonding material may be applied by roller transfer, spraying, brushing, pin-printing—that is by bringing a pin or pins having latex on its ends into contact with the paper through capillary attraction—and the spots may be of various shapes and sizes. If desired, the spots may be of the same size although, for the purpose of adjustability, I prefer to employ spots of different sizes.

The circular character of the paper strip adapts it not only for use as a liner for baskets or other containers, but also as a band, etc. The band may be used to enclose not only apples or other products, but also any single product or object. In other words, the band may be extended around any desired object and secured thereon by pressing the latex areas together.

The latex, which impregnates a portion of the paper, unless the paper is protected, by special means as disclosed in Figs. 2 and 3, will tear the paper when the band is separated, thus injuring and mutilating the paper and rendering it unsatisfactory for further use. In other words, the band is destroyed and cannot be reused in its original form after the latex areas are separated.

In the use of the invention as described, the band with the aligned latex areas can be extended about an object and the areas then pressed together and clinched to form a bond which prevents the opening of the band without tearing the paper. Thus the band may be extended about an arm of a chair and the two ends clinched together to form a permanent seal about the arm and preventing the removal thereof without destroying the paper band. Likewise, one leg of the band may be inserted through an object having an opening therein and then locked by bringing the two latex areas of the band together. Thus, the band is locked in position against removal without destroying the paper adjacent the latex areas.

The foregoing detailed description has been given for clearness of understanding only, and no unnecessary limitations should be understood therefrom, but the appended claims should be construed as broadly as permissible, in view of the prior art.

I claim:

1. A liner for baskets etc. comprising: a fabric wall having overlapping end portions, bonding spots on each of said end portions adapted to be brought into contact, said bonding material having very little attraction for the fabric but having great cohesive force when brought together.

2. A liner for baskets etc. comprising: a fabric wall having edge portions adapted to be brought into overlapping position, cohesive latex areas on the adjacent edge portions of said ends and adapted to be brought into contact to lock together the ends of said wall, the latex area on one end being substantially larger than the latex area on the other end with which it is adapted to be brougth into contact.

3. A liner for baskets, etc., comprising: a paper wall having overlapping end portions and cohesive latex spots adjacent the ends of said end portions and on the adjacent surfaces thereof so that when said latex spots are brought together, an elastic bond is provided adjacent the ends of said end portions.

4. A liner for baskets, etc., comprising: a paper wall having free ends adapted to be brought into overlapping relation, aligned cohesive latex areas on the contacting surfaces of said overlapping edge portions, and paper-reinforcing means in those areas to which the latex is applied.

5. A liner for baskets, etc., comprising: a paper wall having overlapping free ends, protective paper strips secured to the adjacent faces of said overlapping ends, and cohesive latex areas on said strips and adapted to be brought together to join said protective strips.

6. A liner for baskets, etc., comprising: a fabric wall having free ends adapted to be brought into overlapping relation and a plurality of aligned latex areas on each of the adjacent surfaces of said overlapping ends.

7. A band adapted to encircle objects and to be locked therearound, comprising: a cellulose strip having its free ends provided with cohesive latex spot areas, the latex spot areas being smaller than the paper area of the band ends to which the spots are applied, said band being adapted to encircle an object and to be locked therearound by pressing together said cohesive latex areas.

WILLIAM J. MISKELLA.